(12) United States Patent
Ryu et al.

(10) Patent No.: US 8,612,425 B2
(45) Date of Patent: Dec. 17, 2013

(54) APPARATUS, METHOD AND MEDIUM FOR TRANSMISSION AND/OR RECEPTION OF DIGITAL CONTENT BASED ON TIME OR LOCATION INFORMATION

(75) Inventors: Hee-seob Ryu, Suwon-si (KR); Sang-goog Lee, Anyang-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 0 days.

(21) Appl. No.: 13/442,237

(22) Filed: Apr. 9, 2012

(65) Prior Publication Data

US 2012/0198014 A1   Aug. 2, 2012

Related U.S. Application Data

(62) Division of application No. 11/797,757, filed on May 7, 2007, now Pat. No. 8,180,764.

(30) Foreign Application Priority Data

May 11, 2006   (KR) .................. 10-2006-0042632

(51) Int. Cl.
*G06F 7/00* (2006.01)
*G06F 17/30* (2006.01)

(52) U.S. Cl.
USPC ........... 707/722; 707/736; 707/758; 707/912; 707/913; 709/201; 709/206; 709/207

(58) Field of Classification Search
USPC ............... 707/705, 722, 736, 758, 912, 913, 707/999.1; 709/201, 206, 207
See application file for complete search history.

(56) References Cited

U.S. PATENT DOCUMENTS

| 6,771,889 | B1 | 8/2004 | Suga et al. | |
|---|---|---|---|---|
| 6,816,835 | B2 * | 11/2004 | Hayashi | 704/260 |
| 7,039,596 | B1 | 5/2006 | Lu | |
| 7,197,707 | B2 * | 3/2007 | Cicchitelli et al. | 715/269 |

(Continued)

FOREIGN PATENT DOCUMENTS

| JP | 08-33012 | 2/1996 |
|---|---|---|
| JP | 11-136723 | 5/1999 |

(Continued)

OTHER PUBLICATIONS

Notice of Allowance dated Jan. 5, 2012 for related U.S. Appl. No. 11/797,757.

(Continued)

*Primary Examiner* — Hares Jami
(74) *Attorney, Agent, or Firm* — Staas & Halsey LLP (57) ABSTRACT

A digital content transmission apparatus, method and medium, and a digital content reception apparatus, method and medium enable multimedia content, extracted according to the location and time of a transmitting mobile terminal, and alphanumeric text, to be combined into a single message sent to a receiving mobile terminal, thereby allowing a user of the transmitting mobile terminal to reflect the circumstances facing the user in the message. The digital content transmission apparatus includes an input module to receive an alphanumeric message, a state searching module to search for time information and location information of the message, a control module to extract a serial number of a first multimedia content corresponding to the time information and the location information, and a communication module to transmit data into which the message and the extracted serial number are combined.

12 Claims, 9 Drawing Sheets

FIG. 9

(56) References Cited

U.S. PATENT DOCUMENTS

| | | |
|---|---|---|
| 7,372,470 B2 | 5/2008 | Kim et al. |
| 8,027,662 B1 | 9/2011 | Miller et al. |
| 2002/0010748 A1* | 1/2002 | Kobayashi et al. ........... 709/206 |
| 2002/0074344 A1 | 6/2002 | Long et al. |
| 2002/0123327 A1 | 9/2002 | Vataja |
| 2003/0063675 A1 | 4/2003 | Kang et al. |
| 2004/0054732 A1 | 3/2004 | Carter et al. |
| 2004/0253963 A1 | 12/2004 | Park et al. |
| 2007/0027911 A1* | 2/2007 | Hakala et al. .............. 707/104.1 |
| 2008/0032670 A1 | 2/2008 | Wada et al. |
| 2008/0189373 A1* | 8/2008 | Ikonen et al. ................. 709/206 |

FOREIGN PATENT DOCUMENTS

| | | |
|---|---|---|
| KR | 2001-0092024 | 10/2001 |
| KR | 10-2002-0012875 | 2/2002 |
| KR | 2003-0044251 | 6/2003 |
| KR | 10-2004-0013258 | 2/2004 |
| KR | 10-2006-0005926 | 1/2006 |
| KR | 10-2006-0077414 | 7/2006 |

OTHER PUBLICATIONS

Office Action dated Aug. 2, 2011 for related U.S. Appl. No. 11/797,757.

Advisory Action dated May 2, 2011 for related U.S. Appl. No. 11/797,757.

Final Office Action dated Jan. 31, 2011, for related U.S. Appl. No. 11/797,757.

Office Action dated Sep. 21, 2010 for related U.S. Appl. No. 11/797,757.

Final Office Action dated Apr. 27, 2010 for related U.S. Appl. No. 11/797,757.

Office Action dated Oct. 28, 2009 for related U.S. Appl. No. 11/797,757.

Restriction Requirement dated Jun. 25, 2009 for related U.S. Appl. No. 11/797,757.

U.S. Appl. No. 11/797,757, filed May 7, 2007, Hee-Seob Ryu et al., Samsung Electronics Co., Ltd.

* cited by examiner

| PLACE NAME | | COORDINATE INFORMATION | |
|---|---|---|---|
| ADMINISTRATIVE REGION NAME (511) | POI NAME (512) | LATITUDE | LONGITUDE |
| YONGSAN-GU, SEOUL | ELECTRO LAND | 37° 31' 58" | 126° 57' 33" |
| KANGNAM-GU, SEOUL | KANGNAM SUBWAY STATION | 37° 29' 52" | 127° 1' 39" |
| YANGYANG-GUN, KANWON-DO | SEORAK FALL | 38° 6' 4" | 128° 27' 27" |
| INJE-GUN, KANGWON-DO | BAEKDAM TICKET OFFICE | 38° 11' 31" | 128° 21' 29" |
| ⋮ | ⋮ | ⋮ | ⋮ |
| YONGIN-SHI, KYONGGI-DO | EVERLAND | 37° 17' 36" | 127° 12' 6" |
| YONGIN-SHI, KYONGGI-DO | SAMSUNG ADVANCED INSTITUTE OF TECHNOLOGY | 37° 13' 54" | 127° 5' 7" |

FIG. 9

APPARATUS, METHOD AND MEDIUM FOR TRANSMISSION AND/OR RECEPTION OF DIGITAL CONTENT BASED ON TIME OR LOCATION INFORMATION

CROSS-REFERENCE TO RELATED APPLICATIONS

This application is a U.S. divisional application filed under 35 USC 1.53(b) claiming priority benefit of U.S. Ser. No. 11/797,757 filed in the United States on May 7, 2007 now U.S. Pat. No. 8,180,764, which claims earlier priority benefit to Korean Patent Application No. 10-2006-0042632 filed on May 11, 2006 in the Korean Intellectual Property Office, the disclosures of which are incorporated herein by reference in their entirety.

BACKGROUND

1. Field

One or more embodiments of the present invention relate to the transmission and/or reception of digital content, and more particularly, to a digital content transmission and/or reception apparatus, method, and medium for mobile terminals using Short Message Service, Enhanced Message Service (EMS), or Multimedia Message Service (MMS). The digital content transmission and/or reception apparatus, method, and medium enable multimedia content extracted according to a location of a transmitting mobile terminal and a message to be output together to a receiving mobile terminal.

2. Description of the Related Art

Recent developments in integration technology have opened the way for the widespread use of various portable devices such as audio reproduction apparatuses (e.g., cassette tape players and CD players), wireless pagers, mobile phones, MP3 players, and portable game players.

In particular, mobile phones are no longer just for telecommunications but are also tools for providing a variety of features such as a clock, a digital camera, and an MP3 player.

In addition, various messaging services such as Short Message Service, Enhanced Message Service (EMS), or Multimedia Message Service (MMS) are currently available. SMS is a service for transmitting short text messages, EMS is a service for transmitting not only text messages but also music files, audio data, and photos, and MMS is a service for transmitting multimedia content via a wireless Internet.

Mobile phone users may want to transmit messages that can creatively describe their current situations using the aforementioned messaging services.

For example, Korean Patent Laid-Open Gazette No. 2003-044251 describes a technique for transmitting messages which can allow a transmitter to select background image information and text color information for inclusion with a short message and to transmit the short message to a receiver so that the short message can be displayed to the receiver with the background image chosen by the transmitter and in the text color also chosen by the transmitter. This method requires a user to choose one of a plurality of background images for a short message to be sent. If only a few background images are stored in a mobile terminal, it may not take long for a user to search through the background images. However, if a considerable number of background images are stored in a mobile terminal, it may take a long time for a user to search through the background images. Also, a user is likely to choose a background image solely based on the user's subjective judgment. Thus, a background image chosen by a user may not coincide with the situation facing the user, or with the current environment of the user.

SUMMARY

An aspect of one or more embodiments of the present invention describes a digital content transmission apparatus, method, and medium which can enable a transmitting mobile terminal to examine its location and time information, to extract multimedia content according to the results of the examination, and to transmit the extracted multimedia content together with a message.

Another aspect of one or more embodiments of the present invention provides a digital content reception apparatus, method, and medium which can enable a receiving mobile terminal to properly display a message and multimedia content transmitted by a transmitting mobile terminal.

Additional aspects and/or advantages of the invention will be set forth in part in the description which follows and, in part, will be apparent from the description, or may be learned by practice of the invention.

According to another aspect of one or more embodiments of the present invention, a digital content transmission apparatus is provided. The digital content transmission apparatus includes an input module to receive a message including alphanumeric text, a state searching module to search for time information and location information of the message, a control module to extract a serial number of first multimedia content corresponding to at least one of the time information and the location information, and a communication module to transmit data into which the message and the extracted serial number are combined.

According to another aspect of one or more embodiments of the present invention, a digital content reception apparatus is provided. The digital content reception apparatus includes a communication module to receive data including a message and a multimedia content serial number corresponding to at least one of a time information, and a location information of a sender, the message including alphanumeric text, a control module to extract a first multimedia content corresponding to the multimedia content serial number, and a content processing module to generate content by combining the message and the first multimedia content, and an output module to output the content.

According to another aspect of one or more embodiments of the present invention, a digital content transmission method is provided. The digital content transmission method includes receiving a message comprising alphanumeric text, searching for time information and location information of the message, extracting a serial number of first multimedia content corresponding to at least one of the time information and the location information, and transmitting data into which the message and the extracted serial number are combined.

According to another aspect of one or more embodiments of the present invention, a digital content reception method is provided. The digital content reception method includes receiving data including a message and a multimedia content serial number, the message including alphanumeric text, extracting first multimedia content corresponding to the multimedia content serial number, generating content by combining the message and the first multimedia content, and outputting the content.

According to another aspect of one or more embodiments of the present invention, a digital content communication apparatus using time information and location information of a user, is provided. The apparatus includes a digital content transmission apparatus to transmit an alphanumeric message combined with an identification number for a first multimedia content, the content corresponding to at least one of the time information and the location information of the user. The apparatus further includes a digital content reception apparatus to receive the combined alphanumeric message and the identification number, retrieve the first multimedia content from a memory based on the identification number received, and output the combined alphanumeric message and the first multimedia content.

According to still another aspect of one or more embodiments of the present invention, a digital content transmission apparatus is provided. The apparatus includes an input module to receive a message including alphanumeric text, a state searching module to search for time information and location information of a user, a control module to extract a stylized font corresponding to at least one of the time information and the location information, and a communication module which to transmit a message comprising the alphanumeric text displayed in the stylized font.

BRIEF DESCRIPTION OF THE DRAWINGS

The present invention will become more apparent and more readily appreciated from the following description of one or more embodiments taken in conjunction with the accompanying drawings in which.

DETAILED DESCRIPTION

One or more embodiments of the present invention will now be described more fully with reference to the accompanying drawings, in which embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Figure 1:
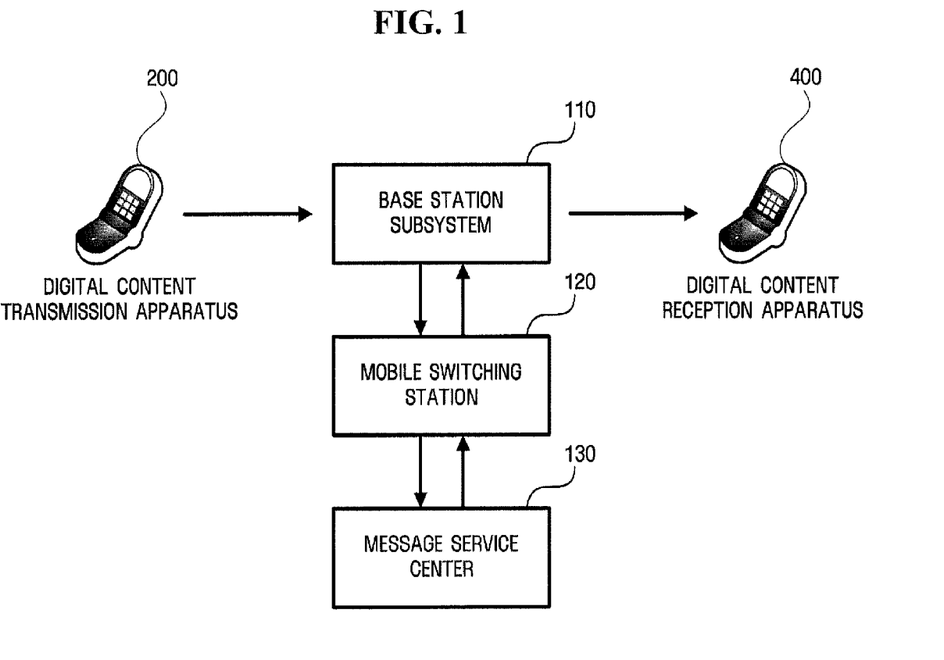
FIG. 1 illustrates a apparatus for displaying digital content, according to one or more embodiments of the present invention.

FIG. 1 illustrates a system for displaying digital content, according to an embodiment of the present invention. Referring to FIG. 1, the system includes a transmitting terminal (hereinafter referred to as the digital content transmission apparatus) 200, a receiving terminal (hereinafter referred to as the digital content reception apparatus) 400, a base station subsystem 110, a mobile switching center 120, and a message service center 130, for example.

A user may input and transmit a message using the digital content transmission apparatus 200. Then, the message is transmitted to the base station subsystem 110. Here, the digital content transmission apparatus 200 and the digital content reception apparatus 400 are devices that can transmit/receive data via a mobile switching center. Examples of the digital content transmission apparatus 200 and the digital content reception apparatus 400 include, but are not limited to, mobile phones, personal digital assistants (PDAs), and laptop computers. The digital content reception apparatus 400 may, for example, include a display module for displaying received messages. The digital content transmission apparatus 200 and the digital content reception apparatus 400 as described herein, need not be limited to a single device but may be embodied in a system including one or more separate components.

The base station subsystem 110 may include a base transceiver station (BTS) and a base station controller (BSC), for example. The BTS and the BSC may transmit/receive signals to/from each other via an Abis interface. As the BTS may include a wireless transceiver, the BTS can communicate with the digital content transmission apparatus 200 by establishing a wireless link using the wireless transceiver. In other words, messages of the digital content transmission apparatus 200 may be received via the BTS. Here, the BSC may manage a plurality of BTSs, and performs a wireless channel setup operation, a frequency hopping operation, and a handover operation. The BSC transmits messages of the digital content transmission apparatus 200 by communicating with the mobile switching station 120.

The mobile switching station 120 can be an automatic system that forms a node for user traffic between a mobile communication network and an ordinary telephone network or between the mobile switching station 120 and another mobile switching station belonging to a different communication network than the mobile switching station 120. The mobile switching station 120 may be interlinked with a fixed network and provide circuit switching services to mobile communication subscribers. The mobile switching station 120 can provide mobile phone subscribers with mobile phone services at any time by keeping track of the mobile phone subscribers, and has a handoff function for maintaining communication services even when subscribers are moving from one place to another. The mobile switching station 120 can transmit messages of the digital content transmission apparatus 200 by communicating with the message service center 130.

Accordingly, the message service center 130 may manage messages transmitted between the digital content transmission apparatus 200 and the digital content reception apparatus 400. In other words, the message service center 130 stores and then forwards messages of the digital content transmission apparatus 200 so that messages may be provided to a digital content reception apparatus 400 that may be currently out of range or otherwise inaccessible at the time of the original transmission. When the digital content reception apparatus 400 is then able to receive messages, the messages stored in the message service center 130 can be forwarded to the digital content reception apparatus 400 via the mobile switching station 120 and the base station subsystem 110.

The digital content transmission apparatus 200 may transmit a message together with background image information corresponding to a background image of the message. Here, the background image may be chosen according to the location of the digital content transmission apparatus 200 and the time when the digital content transmission apparatus 200 transmits the message.

For example, if a user of the digital content transmission apparatus 200 is currently climbing a mountain, an image of a trail on the mountain or an image of the mountain may be chosen as a background image. If the user of the digital content transmission apparatus 200 is currently moving on the road, an image of the road or an image of a nearby city may be chosen as a background image. To accomplish this, the digital content transmission apparatus 200 may include a positioning unit that determines the location of the digital content transmission apparatus 200 and a storage unit that stores various background images.

If the user of the digital content transmission apparatus 200 composes a message at night, a night scene may be chosen as a background image for the message. If the user of the digital content transmission apparatus 200 creates a message in the winter, an image of snow may be chosen as a background image for the message. Or, the two can be combined. For example, if a user of the data 200 creates a message while hiking a mounting in the Winter, an image of the mountain covered with snow may be chosen as a background image for the message.

The digital content transmission apparatus 200 may transmit a message combined with a background image or with a serial number representing the background image. In other words, the digital content reception apparatus 400 may receive a background image or a background image serial number. If the digital content reception apparatus 400 receives a message and a background image, the digital content reception apparatus 400 may display a screen obtained by combining the message and the background image. On the other hand, if the digital content reception apparatus 400 receives a message and a background image serial number, the digital content reception apparatus 400 may extract a background image corresponding to the background image serial number, and combine the message with the extracted background image.

In other words, the digital content transmission apparatus 200 may transmit a background image serial number instead of a background image in order to prevent the waste of network bandwidth. If the digital content reception apparatus 400 does not have a background image corresponding to the background image serial number transmitted by the digital content transmission apparatus 200, the digital content reception apparatus 400 issues a request for the corresponding background image to the digital content transmission apparatus 200.

Figure 2:
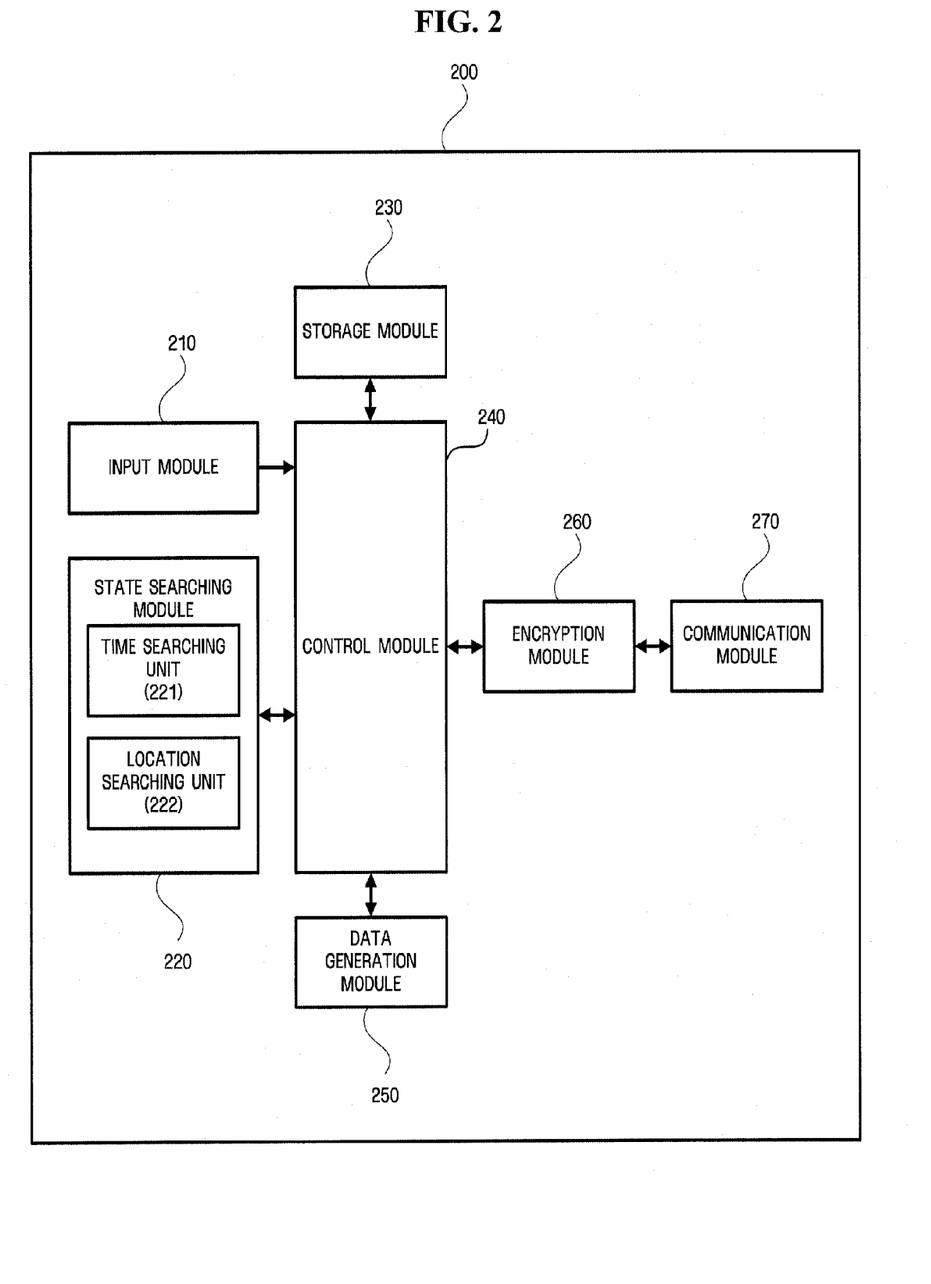
FIG. 2 illustrates a digital content transmission apparatus, according to one or more embodiments of the present invention.

FIG. 2 is a digital content transmission apparatus 200, according to an embodiment of the present invention. Referring to FIG. 2, the digital content transmission apparatus 200 may include an input module 210, a state searching module 220, a storage module 230, a control module 240, a data generation module 250, an encryption module 260, and a communication module 270, for example.

The input module 210 receives a message comprising alphanumeric text from a user. For this, the input module 210 may include one or more buttons, a touch pad, a keypad, and/or a wheel so as to allow the user to input letters or numerals.

The state searching module 220 searches for time information and location information. For this, the state searching module 220 may include a time searching unit 221 that searches for time information and a location searching unit 222 that searches for location information. Time information uses a typical time unit such as a year, month, day, hour, minute, second, season, or any other arbitrary time units set by the user. Messages created at the same hour, minute, and second, but in different seasons, may be considered to correspond to different time information. The time searching unit 221 can search through time information in two-month units according to user input, or other variations by month or week as selected by the user.

Location information may include the names or coordinates of countries, states, administrative regions, counties, cities, streets or individual addresses, and the names or coordinates of points of interest (POI). The location searching unit 222 can search for the coordinates of a POI using at least one of a cell identification (ID) method, an Angle-Of-Arrival (AOA) method, a Time-Of-Arrival (TOA) method, a Time Difference-Of-Arrival (TDOA) method, a Global Positioning System (GPS) method, an Assisted-GPS (A-GPS) method, an Enhanced-Observed Time Difference (E-OTD) method, and a Wireless Application Protocol (WAP) method or any other search method. The coordinates of a POI comprise WGS84 coordinate information or Universal Transverse Mercator (UTM) coordinate information, or other coordinate information.

In order to search for coordinates, the location searching unit 222 may include a module that determines a current location of the digital content transmission apparatus 200, and this will be described later in detail with reference to FIG. 3.

The storage module 230 may store multimedia content corresponding to at least one of time information and location information, or multimedia content serial numbers. Examples of the multimedia content stored in the storage module 230 include still images, moving images, and audio data, for example. Also, the storage module 230 may further store a geographic information database and a content database. Such geographic information databases and the content databases will be described later in detail.

The storage module 230 may be a module to/from which information can be input/output such as a hard disc, a flash memory, RAM, a Compact Flash (CF) card, a Secure Digital (SD) card, a Smart Media (SM) card, a MultiMedia Card (MMC), a memory stick, or any other memory type. The storage module 230 may be disposed in the digital content transmission apparatus 200 or in an external apparatus. In other words, an external apparatus (not shown, hereinafter referred to as the database server) that stores a geographic information database and a content database and provides them to the digital content transmission apparatus 200 may exist in a network. In this case, the digital content transmission apparatus 200 receives a message from a user, transmits a geographic information/content requesting packet to the database server, and is thus provided with geographic information and content.

The control module 240 searches for multimedia content corresponding to time information and location information identified by the state searching module 220, and extracts a serial number given to the identified multimedia content.

A message input to the input module 210 and the multimedia content serial number extracted by the control module 240 are transmitted to the data generation module 250, and the data generation module 250 generates data comprising the message and the multimedia content serial number. The data generation module 250 may change the font of the message according to the identified time and location information or may include font information in the data comprising the message and the multimedia content serial number. The font information may be stored in the storage module 230. In a case where the storage module 230 is included in the database server (not shown), the data generation module 230 may generate data using font information provided by the database server.

Some multimedia content stored in the storage module 230 may not accompany a serial number. In this case, the control module 240 may extract multimedia content, instead of a multimedia content serial number, from the storage module 230. The control module 240 may also extract multimedia content, instead of a multimedia content serial number, from the storage module 230 when receiving a request for multimedia content from the digital content reception apparatus 400. Accordingly, the data generation module 250 may generate data comprising an alphanumeric message, font information and multimedia content, for example.

The control module 240 generally controls the operation of the digital content transmission apparatus 200 by controlling the input module 210, the state searching module 220, the storage module 230, the data generation module 250, the encryption module 26Q, and the communication module 270.

The data generated by the data generation module 250 may further be transmitted to the encryption module 260. Then, the encryption module 260 encrypts the data. Encryption systems are classified into symmetric key encryption systems and public key encryption systems. Symmetric key encryption systems such as Data Encryption Standard (DES) encryption systems are characterized by using the same key to encrypt and decrypt data. When the digital content transmission apparatus 200 and a digital content reception apparatus 400, which will be described later in detail, exchange data using a symmetric key encryption method, the digital content transmission apparatus 200 and the digital content reception apparatus 400 must exchange an encryption key through a secure channel. If the encryption key is exposed, the security of data transmitted between the digital content transmission apparatus 200 and the digital content reception apparatus 400 may no longer be guaranteed.

On the other hand, public key encryption systems such as Rivest-Shamir-Adleman (RSA) encryption systems are characterized by their asymmetrical characteristics. A public key encryption system uses different keys to encrypt and decrypt data. A key used by a public key encryption system to encrypt data is referred to as an encryption key, and a key used by a public key encryption system to decrypt data is referred to as a decryption key. In this regard, when the digital content transmission apparatus 200 uses a public key encryption method, an encryption key, also called a public key, does not need to be exchanged between the digital content transmission apparatus 200 and the digital content reception apparatus 400, and the digital content reception apparatus 400 can decrypt data encrypted by the digital content transmission apparatus 200 by using a private key with the digital content reception apparatus 400.

The data encrypted by the encryption module 260 may be transmitted to the communication module 270. Then, the communication module 270 transmits the encrypted data. The encrypted data transmitted by the communication module 270 may be transmitted to a BSC via a BTS. There, depending on the embodiment, the communication module 270 may communicate with the BTS using a Global System for Mobile Communication (GSM) method, a Code Division Multiple Access (CDMA) method, a Wideband CDMA (WCDMA) method, a Wireless Local Loop (WLL) method, a Wireless Local Area Network (WLAN) method, a Digital Video Broadcasting (DVB) method, or any other wireless communication protocol.

Figure 3:
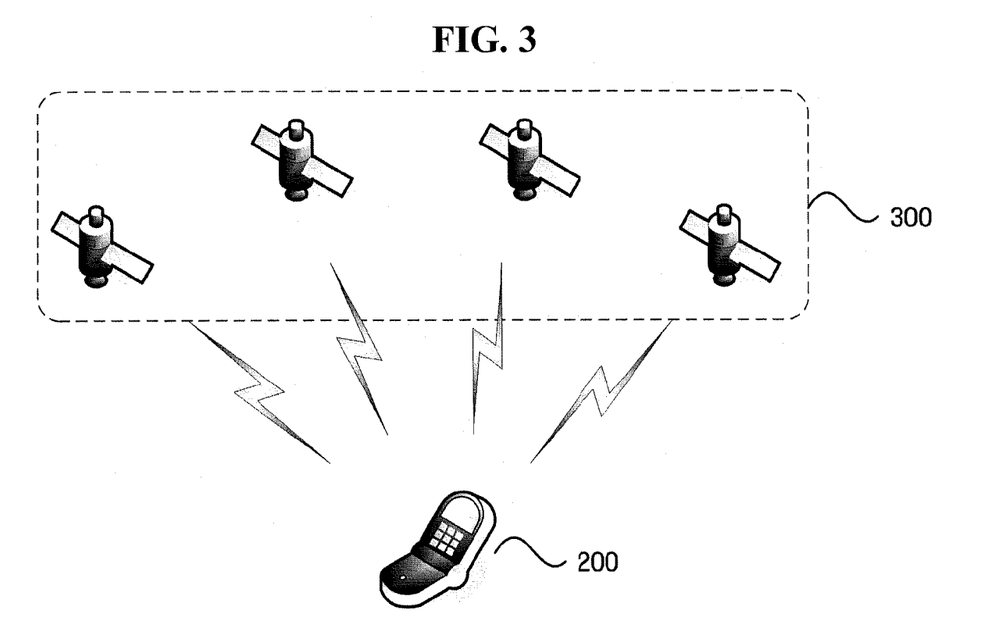
FIG. 3 illustrates a determining of a location of a digital content transmission apparatus, such as that illustrated in FIG. 2, according to one or more embodiments of the present invention.

FIG. 3 explains how the location of the digital content transmission apparatus 200 illustrated in FIG. 2 is determined, according to an embodiment of the present invention. Referring to FIG. 3, the location searching unit 222 may include a GPS receiver. In this case, the location searching unit 222 may determine its location using the GPS receiver.

The GPS receiver is a positioning system which can determine the location of an object that is at a standstill or is moving according to information transmitted by GPS satellites 300. In other words, the GPS receiver determines its location by keeping track of the time it takes for a radio wave to travel from each of the GPS satellites 300 to the GPS receiver.

The most important factor that determines the distances between the GPS receiver and the GPS satellites 300 is time. Each of the GPS satellites 300 is equipped with a highly stable atomic clock. If the atomic clocks of the GPS satellites 300 precisely coincides with a clock of the GPS receiver, the GPS receiver can be three-dimensionally positioned simply based on the distances between the GPS receiver and three GPS satellites 300. Generally, a GPS receiver receives radio waves from four GPS satellites so as to eliminate any unknown difference between time information of the GPS receiver and satellite time information.

Each of the GPS satellites 300 transmits two carrier waves, three codes, and a satellite message. Carrier waves and codes use an integer multiple of the fundamental frequency, i.e., 10.23 MHz, while satellite messages use frequencies as low as 50 Hz. Carrier waves transmitted by the GPS satellites 300 may use 154 times the fundamental frequency, i.e., 1575.42 MHz (L1, wavelength: 19 cm), or 120 times the fundamental frequency, i.e., 1227.60 MHz (L2, wavelength: 24.4 cm).

The location searching unit 222 may determine its location using a mobile phone network-based cell tracking method or using a distance calculation method involving the sensing of a received radio wave signal of a predetermined frequency band allocated through frequency sharing, or any other type of location finding. The cell tracking method involves the analysis of the sensitivity of radio waves between base stations and has an error range of 500-1,500 m.

Figure 4:
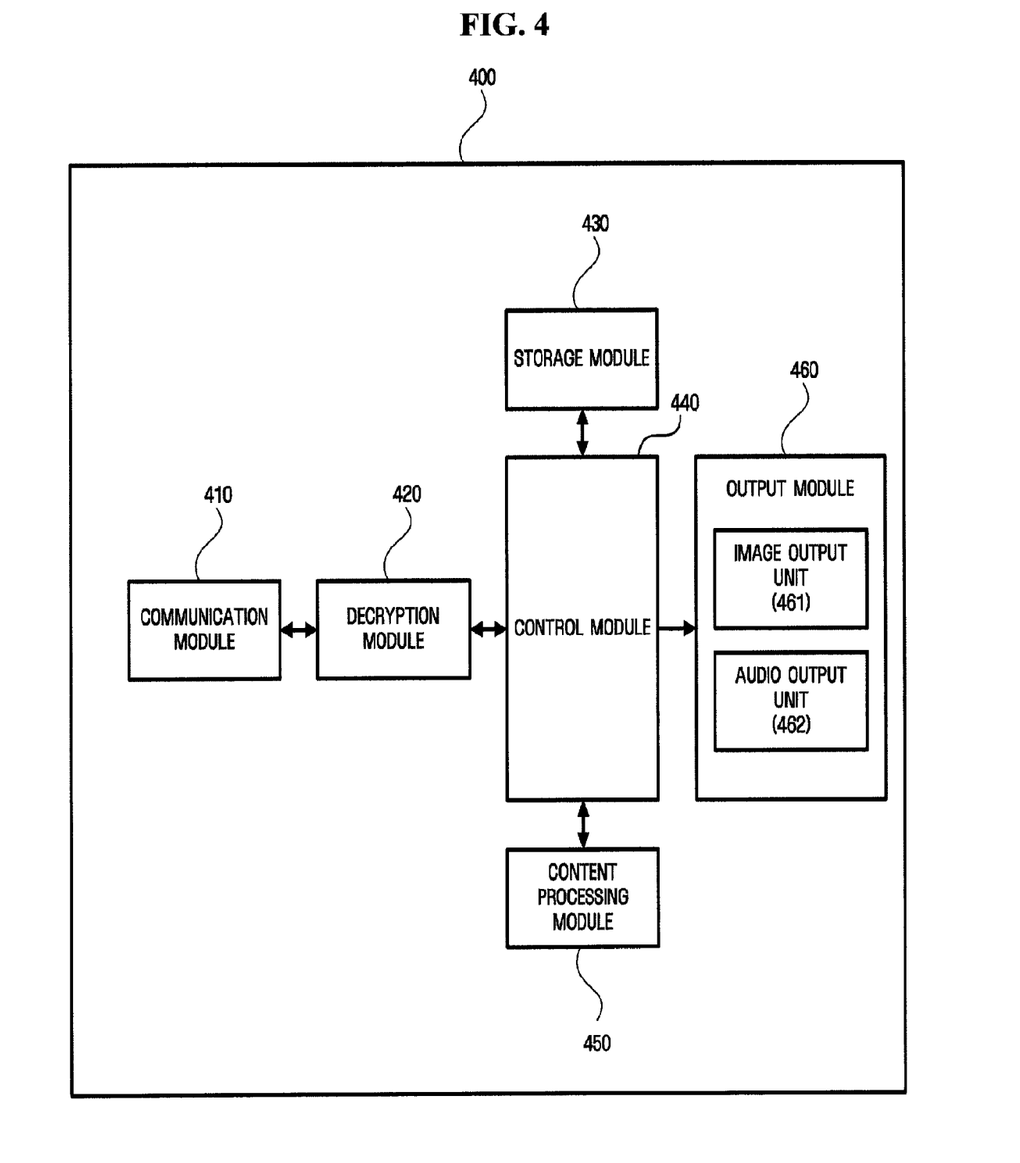
FIG. 4 illustrates a digital content reception apparatus, according to one or more embodiments of the present invention.

FIG. 4 is a digital content reception apparatus 400, according to an embodiment of the present invention. Referring to FIG. 4, the digital content reception apparatus 400 includes a communication module 410, a decryption module 420, a storage module 430, a control module 440, a content processing module 450, and an output module 460.

The communication module 410 receives data comprising an alphanumeric message and a predetermined serial number representing the multimedia content. The communication module 410 may receive the data via a BTS. The communication module 410 may communicate with the BTS using a GMS method, a CDMA method, a WCDMA method, a WLL method, a WLAN method, or a DVB method, or any other wireless communication protocol.

The data received by the communication module 410 is transmitted to the decryption module 420. Then, the decryption module 420 decrypts the data. The decryption module 420 may use different decryption methods according to whether the data has been encoded using a symmetric key encryption system or a public key encryption system.

The storage module 430 may store multimedia content corresponding to at least one of time information or location information and multimedia content serial numbers.

Examples of the multimedia content stored in the storage module 430 include still images, moving images, and audio data, for example. In addition, the multimedia content stored in the storage module 430 corresponds to time information or location information. For example, the storage module 430 may store multimedia content associated with a road location on a summer afternoon and multimedia content associated with a mountain location on a winter night, together with respective corresponding serial numbers.

Also, the storage module 430 may store data for one or more fonts. The content processing module 450 can extract one of the font data stored in the storage module 430, and apply the extracted font data to a received message, as will be described later in further detail.

The storage module 430 may be a module to or from which information can be input or output such as a hard disc, a flash memory, RAM, a CF card, an SD card, an SM card, an MMC, a memory stick, or any other memory type. The storage module 430 may be disposed in the digital content reception apparatus 400 or in an external apparatus. The external apparatus may be a database server, which has already been described, and therefore, a detailed description of the database server will not be further described.

The data decrypted by the decryption module 420 is transmitted to the control module 440. The control module 440 extracts multimedia content corresponding to the serial number included in the decrypted data from the storage module 430. If the multimedia content corresponding to the serial number included in the decrypted data is not present in the storage module 430, the control module 440 may transmit a multimedia content requesting packet via the communication module 410. Accordingly, the communication module 410 may receive data including multimedia content, instead of data including a multimedia content serial number. In this case, the control module 440 need not search through the multimedia content present in the storage module 430.

In addition, the control module 440 generally controls the operation of the digital content reception apparatus 400 by controlling the communication module 410, the decryption module 420, the storage module 430, the content processing module 450, and the output module 460.

The message included in the decrypted data and the multimedia content extracted by the control module 440 are transmitted to the content processing module 450. Then, the content processing module 450 generates content by combining the message, the multimedia content and the stylized font data, if any font data is present. Content into which a message and multimedia are combined will be described later in greater detail with reference to FIG. 7.

The content generated by the content processing module 450 is output by the output module 460. For this, the output module 460 may include a video output unit 461 and an audio output unit 462. The video output unit 461 may include an image display device such as a cathode ray tube (CRT), a liquid crystal display (LCD), a light-emitting diode (LED), an organic LED, or a plasma display panel (PDP), for example. The video output unit 461 displays an image portion of multimedia content and any alphanumeric message.

The audio output unit 462 may output an audio part of the multimedia content. Specifically, the audio output unit 462 can generate a wave in the air by converting an electric signal comprising audio data into a vibration of a vibration plate, and thus mimics a sound wave. Generally, a speaker may be used as the audio output unit 462. The audio output unit 462 may also convert an electric signal into a sound wave using a galvanic electricity method, an electromagnetic method, a static electricity method, a dielectric method, or a magnetostriction method.

Figure 5:
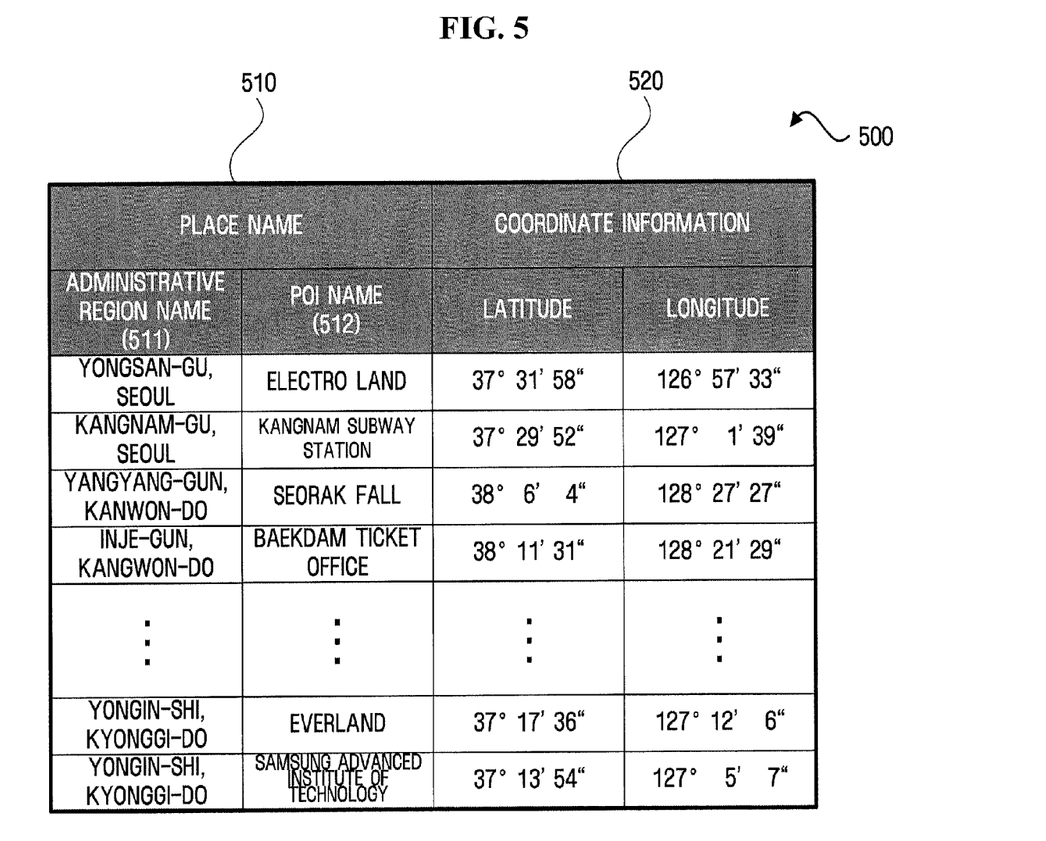
FIG. 5 illustrates a geographic information database, according to one or more embodiments of the present invention.

FIG. 5 illustrates a geographic information database 500, according to an embodiment of the present invention. Referring to FIG. 5, the geographic information database 500 may include a place name field 510 and a coordinate field 520, for example.

The place name field 510 may include an administrative region name field 511 and a POI name field 512. The POI name field 512 includes the names of areas or facilities that are well known to everyday people, and these areas or facilities may not be the same as respective corresponding administrative region names. For example, a POI may be located within two administrative regions.

The coordinate field 520 includes coordinate information. The coordinate information included in the coordinate field 520 may comprise WGS84 coordinate information, Universal Transverse Mercator (UTM) coordinate information, or other coordinate information.

Once the coordinates for a current location of the digital content transmission apparatus 200 are determined by the GPS receiver included in the location searching unit 222, the location searching unit 222 extracts from the geographic information database 500 the names of places that are within a predetermined range of the determined coordinates. If none of the places registered in the geographic information database 500 are within the predetermined range of the determined coordinates, the location searching unit 222 may extract the name of a place with coordinates closest to the coordinates determined by the geographic information database 500. The place names extracted by the location searching unit 222 may be transmitted to the control module 240 together with respective corresponding time information detected by the time searching unit 221.

Figure 6:
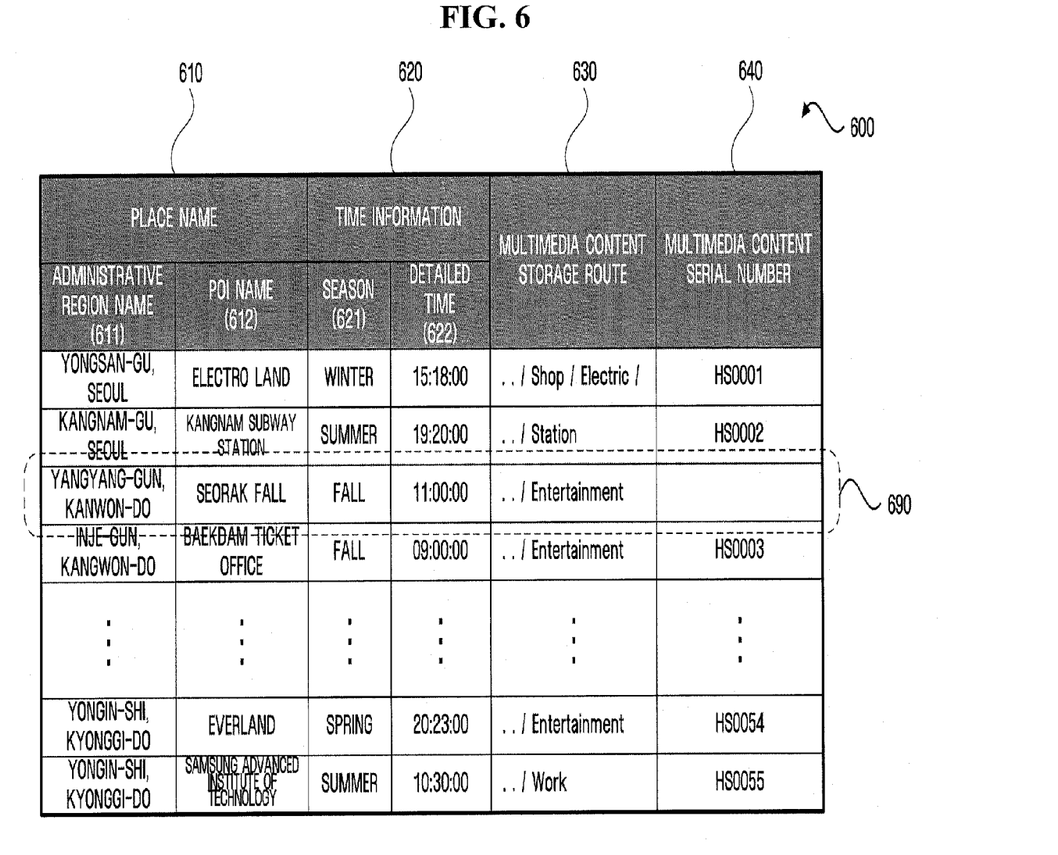
FIG. 6 illustrates a content database, according to one or more embodiments of the present invention.

FIG. 6 is a content database 600, according to an embodiment of the present invention. Referring to FIG. 6, the content database 600 includes a place name field 610, a time information field 620, a multimedia content storage route field 630, and a multimedia content serial number field 640, for example.

The place name field 610 may include an administrative region name field 611 and a POI name field 612, as described above with reference to FIG. 5.

The time information field 620 may further include a season field 621 and a detailed time field 622. The detailed time field 622 may include hour, minute, and second information. Thus, the time information field 620 of the content database 600 includes season information included in the season field 621 and the hour, minute, and second information included in the detailed time field 622. However, the time information field 620 may include time information specified using time units other than those set forth herein. For example, the time information field 620 may include year, month, day, hour, minute, second, and season information or may include time information specified using a any other time unit arbitrarily chosen by a user, e.g., time information specified using two-month units.

The multimedia content storage route field 630 thus, may specify where in the storage module 230 multimedia content corresponding to place name information and time information is stored.

The control module 240 extracts from the storage module 230 a multimedia content serial number by referencing place name information and time information transmitted by the state searching module 220. If the control module 240 receives a multimedia content requesting packet from the digital content reception apparatus 400, the control module 240 may extract multimedia content, instead of a multimedia content serial number, from the storage module 230 by referencing multimedia content storage route information included in the multimedia content storage route field 630.

The geographic information database 500 and the content database 600 may be edited by a user. In other words, a user may determine multimedia content corresponding to a predetermined time and a predetermined place and store the multimedia content in the storage module 230. For example, a frequent traveler may choose multimedia content including postcards of favorite points of interest. An architecture buff may choose multimedia content including images of her favorites buildings and monuments. A restaurant reviewer may choose multimedia content including facsimiles of menus. An inhabitant of a small town may choose multimedia content including images of friends and family who the inhabitant may be visiting at any particular time. Each of the above are provided as exemplary applications of embodiments of the present invention and are not intended to limit to the same.

The digital content transmission apparatus 200 may include a content generation apparatus (not shown) such as a digital camera or a camcorder. For multimedia content generated by the content generation apparatus, the state searching module 220 may search for time information and location information that correspond to the circumstances in which the multimedia content was generated, and the control module 240 may store the multimedia content in the storage module 230 together with the identified time and location information, and update the geographic information database 500 and the content database 600 accordingly. In this case, a user may decide whether to allocate a serial number to each multimedia content, for example. Multimedia content not accompanying a serial number such as multimedia content 690 can be included in the content database 600.

Figure 7:
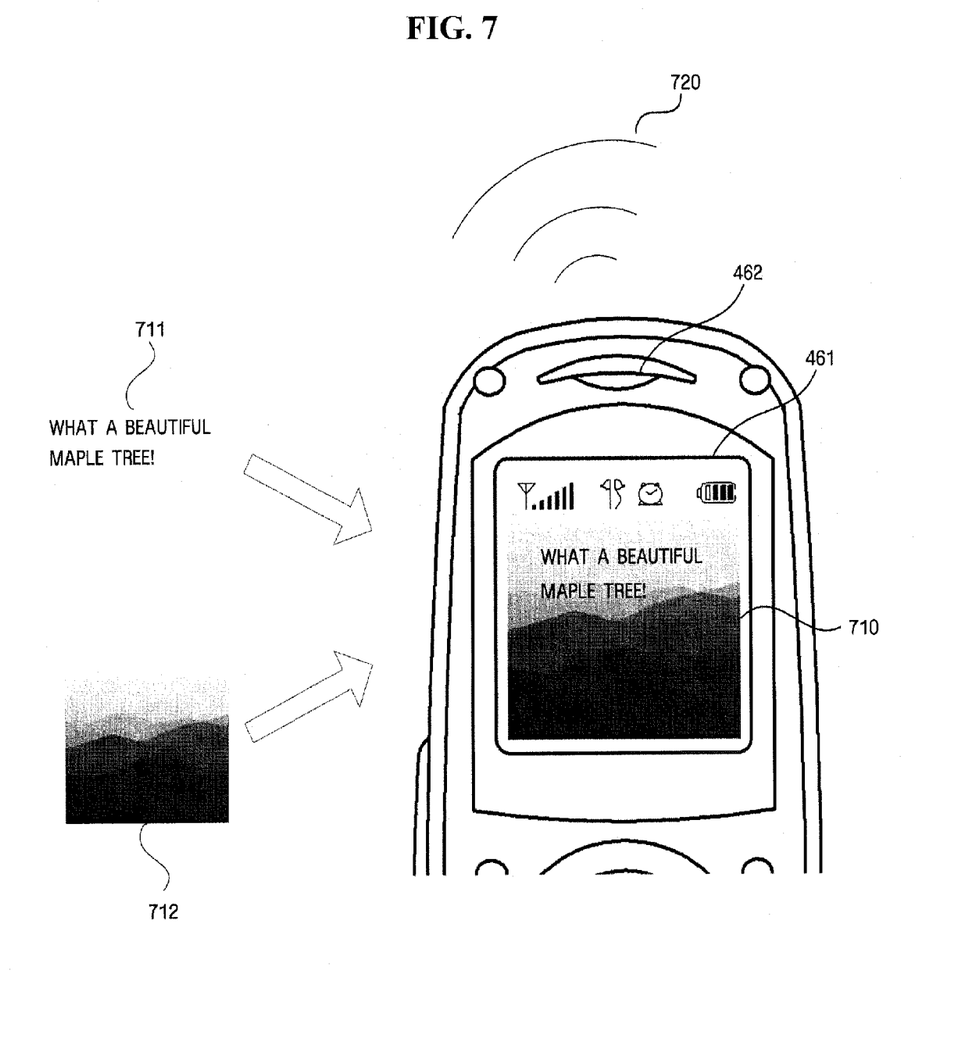
FIG. 7 illustrates a combination of a message and multimedia content, according to one or more embodiments of the present invention.

FIG. 7 illustrates a message and multimedia content according to an embodiment of the present invention. Referring to FIG. 7, the content processing module 450 of the digital content reception apparatus 400 combines a message 711 and multimedia content 712 transmitted by the control module 440. In other words, the content processing module 450 generates custom video content 710 by using a video part of the multimedia content as a background image 712 and placing the message 711 over the background image 712. Thereafter, the content processing module 450 transmits an audio part 720 of the multimedia content, if any, i.e., audio content 720, to the audio output unit 462.

The video output unit 461 outputs the video content 710 generated by the content processing module 450, and the audio output unit 462 outputs the audio content 720. The message 711, which is received from the digital content transmission apparatus 200, may be written in a predetermined font, the font also potentially determined by the current time and location information. The content processing module 450 extracts the same font as the font of the message 711 from the storage module 430 and applies the extracted font to the message 711.

As described above, multimedia content may comprise still images, moving images and audio. Accordingly, the background image 712 may be a still image or a moving image. Thus, a user of the digital content reception apparatus 400 can view the message 711 laid over a still image or a moving image and listen to the audio content 720 output by the audio output unit 462.

Figure 8:
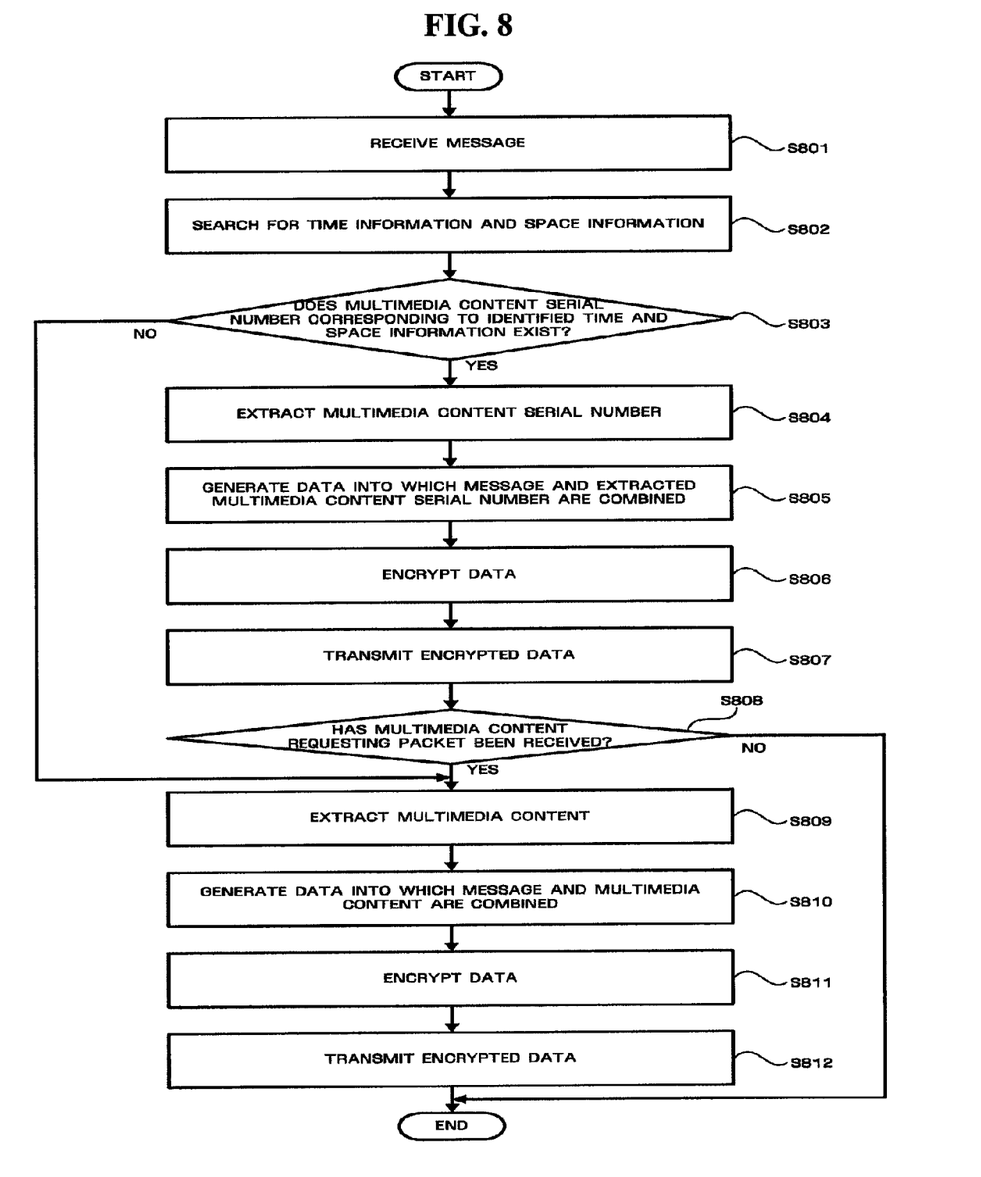
FIG. 8 illustrates a digital content transmission method, according to one or more embodiments of the present invention.

FIG. 8 illustrates a digital content transmission method according to an embodiment of the present invention. Referring to FIG. 8, in operation S801, the input module 210 of the digital content transmission apparatus 200 may receive a message comprising alphanumeric text from a user.

In operation S802, the state searching module 220 searches for time information and location information. Time information may include month, day, hour, minute, second, and season information, or any other arbitrary user selected measure of time. Location information may include countries, states, counties, cities, streets, individual addresses, an administrative region name (511) and a POI name (512) or may include coordinate information.

The location searching unit 222 of the state searching module 220 may search for the coordinates of a predetermined region using at least one of a cell ID method, an AOA method, a TOA method, a TDOA method, a GPS method, an A-GPS method, an E-OTD method, and a WAP method, for example, and coordinate information provided by the location searching unit 222 may comprise WGS84 coordinate information or Universal Transverse Mercator (UTM) coordinate information, or other coordinate information, for example.

In operation S803, the time information and the location information identified by the state searching module 220 may be transmitted to the control module 240, and the control module 240 may search the storage module 230 for a multimedia content serial number corresponding to the identified time and location information. In operation S804, if the multimedia content serial number is found in the storage module 230, the control module 240 extracts the found multimedia content serial number. In operation S809, if the multimedia content serial number is not found in the storage module 230, the control module 240 may extract multimedia content corresponding to the identified time and location information. Therefore, the storage module 230 may store multimedia content and multimedia content serial numbers in advance. The multimedia content stored in the storage module 230 may include at least one of still image, moving image, and audio data.

A message and one of the found multimedia content serial number and the extracted multimedia content may then be transmitted to the data generation module 250. Then, in operation S805 or S810, the data generation module 250 may generate custom message data by combining the message with the found multimedia content serial number or the extracted multimedia content. The data generation module 250 may also change the font of the message according to the identified time and location information, and may insert font information into the data obtained in operation S805 or S810.

In operation S806 or S811, the data obtained in operation S805 or S810 may be transmitted to the encryption module 260, and the encryption module 260 may encrypt the data using an encryption method such as a symmetric key encryption method or a public key encryption method.

In operation S807 or S812, the encrypted data may be transmitted to the communication module 270, and the communication module 270 may transmit the encrypted data to the digital content reception apparatus 400.

The communication module 270 may receive a multimedia content requesting packet from the digital content reception apparatus 400. For this, in operation S808, the control module 240 keeps monitoring whether a multimedia content requesting packet is received from the digital content reception apparatus 400. In operation S809, if a multimedia content requesting packet is received, the control module 240 may extract multimedia content corresponding to the received packet from the storage module 230.

In operation S810, the data generation module 250 may generate data by combining the extracted multimedia content and a message. In operation S811, the data obtained in operation S810 may be encrypted by the encryption module 260. In operation S812, the encrypted data obtained in operation S811 may be transmitted to the digital content reception apparatus 400.

Figure 9:
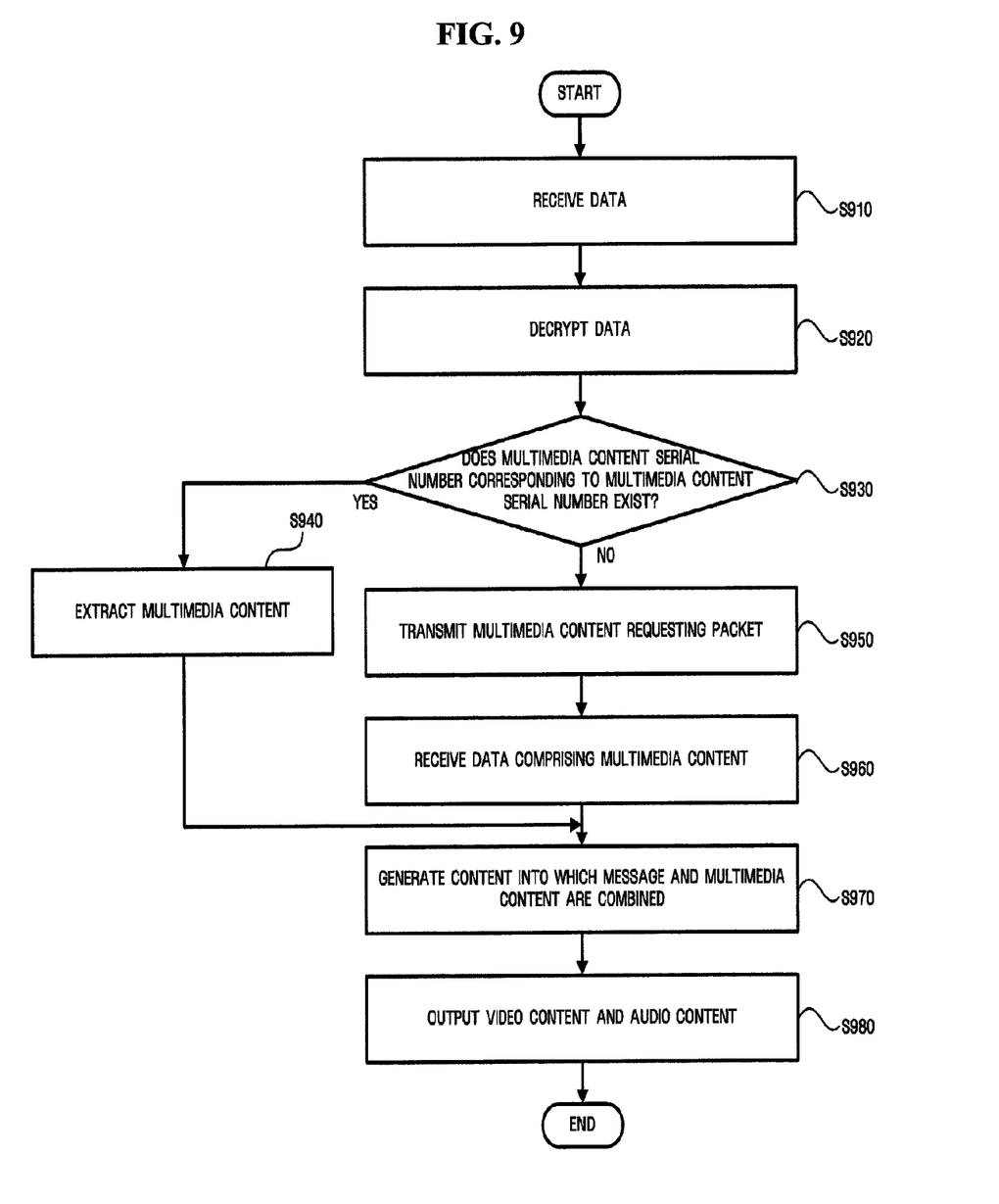
FIG. 9 illustrates a digital content reception method, according to one or more embodiments of the present invention.

FIG. 9 illustrates a digital content reception method, according to an embodiment of the present invention. Referring to FIG. 9, in operation S910, the communication module 410 of the digital content reception apparatus 400 may receive data that includes a message including of alphanumeric text and a predetermined multimedia content serial number. In operation S920, the data received in operation S910 may be transmitted to the decryption module 420, and the decryption module 420 may decrypt the received data according to how the received data has been encrypted.

In operation S930, the decrypted data obtained in operation S920 is transmitted to the control module 440, and the control module 440 searches the storage module 430 for multimedia content corresponding to the multimedia content serial number included in the decrypted data. In operation S940, if the multimedia content corresponding to the multimedia content serial number included in the decrypted data exists in the storage module 430, the control module 440 extracts the corresponding multimedia content from the storage module 430. In operation S450, the control module 440 may transmit the extracted multimedia content to the content processing module 450 together with a message. On the other hand, if the multimedia content corresponding to the multimedia content serial number included in the decrypted data does not exist in the storage module 430, the control module 440 may transmit a multimedia content requesting packet to an external storage device via the communication module 410. Here, the multimedia content requesting packet may comprise the multimedia content serial number included in the decrypted data.

In operation S960, data including multimedia content may be received, potentially from an external device, via the communication module 410 in response to the transmission of the multimedia content requesting packet. The control module 440 transmits the multimedia content included in the data received in operation S960 to the content processing module 450 together with the message included in the data received in operation S910.

In operation S970, the content processing module 450 generates content by combining the message and the multimedia content transmitted by the control module 440, and transmits the content to the output module 460. In other words, the content processing module 450 uses a video part of the multimedia content obtained in operation S940 or S960 as a background image, places the message transmitted by the control module 440 over the background image, transmits video content obtained as the results of the placing to the video output unit 461, and transmits an audio part of the multimedia content obtained in operation S940 or S960 to the audio output unit 462. Here, the video part of the multimedia content obtained in operation S940 or S960 may be a still image, a moving image or a background image.

In operation S980, the output module 460 outputs the video content and the audio content obtained in operation S970.

It will be understood that each block of the flowchart illustrations, and combinations of blocks in the flowchart illustrations, can be implemented by media, e.g., computer readable medium, by computer readable code, e.g., as computer program instructions. This computer readable code may also be stored in a computer usable or computer-readable memory that can direct a computer or other programmable data processing apparatus to function in a particular manner, such that the instructions stored in the computer usable or computer-readable memory produce an article of manufacture including instruction data that implement the function specified in the flowchart block or blocks.

The computer readable code may also be loaded onto a computer or other programmable data processing apparatus to cause a series of operational actions to be performed on the computer or other programmable apparatus to produce a computer implemented process such that the instructions that execute on the computer or other programmable apparatus implement the operations specified in the flowchart block or blocks.

And each block of the flowchart illustrations may represent a module, segment, or portion of code, which include one or more executable instructions for implementing the specified logical operation(s). It should also be noted that in some alternative implementations, the operations noted in the blocks may occur out of the order. For example, two blocks shown in succession may in fact be executed substantially concurrently or the blocks may sometimes be executed in the reverse order, depending upon the operation involved.

As described above, the digital content transmission apparatus, method, and medium and the digital content reception apparatus, method, and medium have a number of advantages, not limited to those listed herein.

A transmitting mobile terminal may examine its location information and time information, and transmit a message together with multimedia content extracted according to the results of the examination, thereby allowing a user of the transmitting mobile terminal to reflect the circumstances facing the user into a message to be transmitted.

A receiving mobile terminal may display both a message and multimedia content transmitted by a transmitting mobile terminal, thereby allowing a user of the receiving mobile terminal to recognize the circumstances facing a user of the transmitting mobile terminal.

A transmitting mobile terminal may further transmit a serial number representing a multimedia content, rather than the content itself, in order to minimize transmission time and preserve bandwidth. Similarly, a receiving mobile terminal may receive the serial number representing a multimedia content and retrieve the content from an internal or external memory.

A transmitting mobile terminal may examine its location information and time information, and transmit a message together with stylized font information extracted according to the results of the examination, thereby allowing a user of the transmitting mobile terminal to stylize the message font to reflect the circumstances facing the user. A receiving mobile terminal receives the message and the font information and displays the message in stylized font reflecting the user circumstances.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A digital content reception apparatus comprising:
   a communication module, in the digital content reception apparatus, to receive data comprising a message and a serial number that uniquely represents a first multimedia content
   corresponding to at least one of a time information and a location information of a sender of the message without receiving the first multimedia content, the message comprising alphanumeric text;

a control module to extract the first multimedia content without user input corresponding to the serial number from among a plurality of serial numbers each representing a plurality of different multimedia content stored in the digital content reception apparatus; and
a content processing module to generate content by combining the message and the first multimedia content; and
an output module to output the content.

2. The digital content reception apparatus of claim 1, wherein, if the data comprises a second multimedia content, the content processing module generates content by combining the message and the second multimedia content.

3. The digital content reception apparatus of claim 1, further comprising a storage module that stores the first multimedia content and the serial number that uniquely represents the first multimedia content.

4. The digital content reception apparatus of claim 3, wherein the control module extracts the first multimedia content from the storage module.

5. The digital content reception apparatus of claim 1, wherein the first multimedia content comprises at least one of a still image, a moving image, and audio data.

6. A digital content reception method performed in a digital content reception apparatus, the method comprising:
receiving, in the digital content reception apparatus, data comprising a message and a serial number that uniquely represents a first multimedia content corresponding to at least one of a time information and a location information of a sender of the message without receiving the first multimedia content, the message comprising alphanumeric text;
extracting, without user input, the first multimedia content corresponding to the serial
number from among a plurality of serial numbers each representing a plurality of different multimedia content stored in the digital content reception apparatus;
generating content by combining the message and the first multimedia content; and outputting the content.

7. The digital content reception method of claim 6, wherein, if the data comprises a second multimedia content, the generating of the content comprises generating content by combining the message and the second multimedia content.

8. The digital content reception method of claim 6, wherein the extracting comprises extracting the first multimedia content and the serial number that uniquely represents the first multimedia content from a storage module disposed in the digital content reception apparatus.

9. The digital content reception method of claim 6, wherein the first multimedia content comprises at least one of a still image, a moving image, and audio data.

10. The digital content reception method of claim 6, further comprising extracting a stylized font for the alphanumeric text, the font corresponding to at least one of the time information and the location information.

11. At least one non-transitory medium comprising computer readable code to control at least one processing element to implement the method of claim 6.

12. A digital content communication system using time information and location information of a user, the system comprising:
a digital content transmission apparatus to transmit an alphanumeric message combined with an identification number that uniquely represents a first multimedia content without transmitting the first multimedia content, the content corresponding to at least one of the time information and the location information of the user; and
a digital content reception apparatus to,
receive the combined alphanumeric message and the identification number,
retrieve the first multimedia content without user input from a memory of the digital content reception apparatus based on the identification number received, and
output the combined alphanumeric message and the first multimedia content.

* * * * *